(12) United States Patent
Sakurai

(10) Patent No.: US 6,453,769 B2
(45) Date of Patent: Sep. 24, 2002

(54) ACCESSORY PANEL MOUNTING STRUCTURE FOR A STEERING WHEEL

(75) Inventor: Koji Sakurai, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 7 days.

(21) Appl. No.: 09/729,076

(22) Filed: Dec. 5, 2000

(30) Foreign Application Priority Data

Dec. 10, 1999 (JP) ............................................. 11-352080

(51) Int. Cl.[7] .................................................. G05G 1/10
(52) U.S. Cl. ........................................................ 74/552
(58) Field of Search ....................... 74/552, 558, 558.5

(56) References Cited

U.S. PATENT DOCUMENTS 5,588,666 A * 12/1996 Numata .................... 280/728.2
5,848,806 A * 12/1998 Hosoi et al. ................. 280/779
5,855,144 A *  1/1999 Parada ..................... 200/61.54
6,062,102 A *  5/2000 Jacoby ......................... 74/494
6,299,196 B1 * 10/2001 Suzuki et al. ............. 280/728.2

* cited by examiner

Primary Examiner—David A. Bucci
Assistant Examiner—Julie K. Smith
(74) Attorney, Agent, or Firm—Pillsbury Winthrop LLP

(57) ABSTRACT

A steering wheel includes a ring, a plurality of spokes extending from the ring toward the middle of the steering wheel, and a pad encompassed by the ring. An accessory panel having a switch is secured to the spokes. A support member supports the accessory panel with respect to the spokes. A fastening member fastens the accessory panel to the spokes. The support member is located separately from the fastening member.

5 Claims, 8 Drawing Sheets

ACCESSORY PANEL MOUNTING STRUCTURE FOR A STEERING WHEEL

BACKGROUND OF THE INVENTION

The present invention relates to steering wheels for vehicles, and, more particularly, to structures for mounting accessory panels having various switches or push buttons on metal spoke cores.

A typical steering wheel includes a ring, a pad encompassed by the ring, and a plurality of spokes extending from the ring toward the middle of the steering wheel.

The spoke may include an accessory panel on which various switches are provided. The switches are manipulated to turn on and off, for example, an air conditioner, radio, or CD player.

The structure for mounting the accessory panel on the steering wheel includes a pair of mounting seats formed integrally with the associated metal spoke cores. The accessory panel has a resin frame, and a pair of extensions that extend integrally from a side wall of the frame. A mounting portion extends from a distal end of each extension in a bent manner. The mounting portions are each fastened to the associated mounting seat with a bolt. This secures the accessory panel to the spoke core.

However, since the accessory panel is secured to the spoke cores simply with the two bolts, manipulation of the switches on the accessory panel elastically deforms the mounting portions, thus eventually deforming the extensions. This displaces the accessory panel downward. Accordingly, to improve the rigidity of the frame, a metal reinforcing plate is inserted in the accessory panel frame when the frame is molded with resin. This increases the number of accessory panel parts while complicating the procedure for mounting the accessory panel, thus increasing the manufacturing cost.

SUMMARY OF THE INVENTION

Accordingly, to solve these problems, it is an objective of the present invention to provide an accessory panel mounting structure for a steering wheel that improves the rigidity of an accessory panel in a mounted state without inserting a metal reinforcing plate.

To achieve the above objective, the present invention provides an accessory panel mounting structure for a steering wheel having a ring, a plurality of spokes extending from the ring toward the middle of the steering wheel, and a pad encompassed by the ring. An accessory panel including a switch is secured to the spokes. The mounting structure comprises a support member for supporting the accessory panel with respect to the spokes and a fastening member for fastening the accessory panel to the spokes. The support member is located separately from the fastening member.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

An embodiment of the present invention will now be described with reference to the attached drawings.

Figure 9:
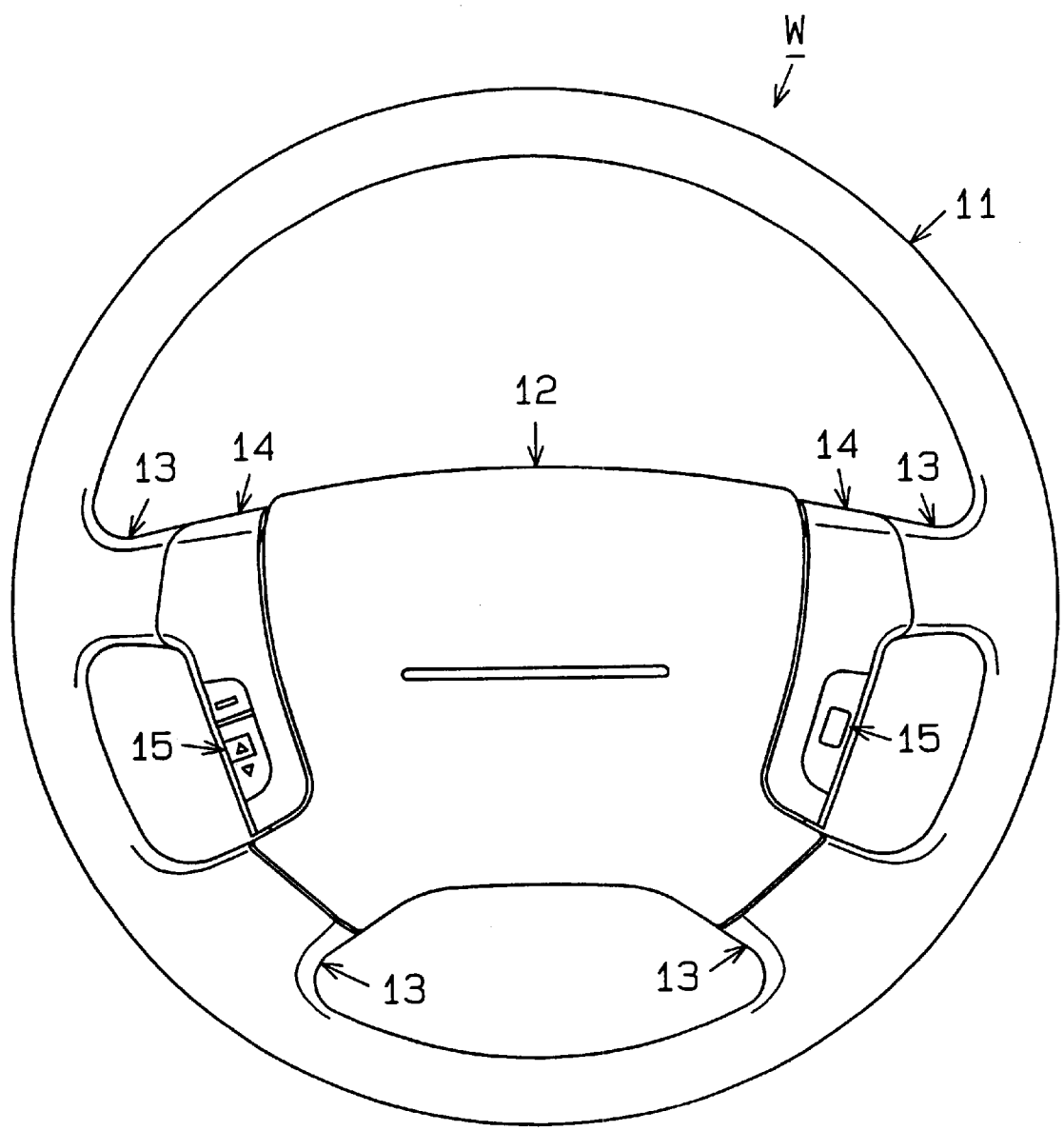
FIG. 9 is a front view showing the steering wheel.

As shown in FIG. 9, a steering wheel W includes a ring 11, a pad 12 encompassed by the ring 11, and four spokes 13. The spokes 13 extend from the ring 11 toward the middle of the steering wheel W to connect the ring 11 to the pad 12. The steering wheel W also has a pair of accessory panels 14 provided near opposite sides of the pad 12. Each accessory panel 14 includes a switch 15 for turning on and off, for example, an air conditioner or a radio.

Figure 6:
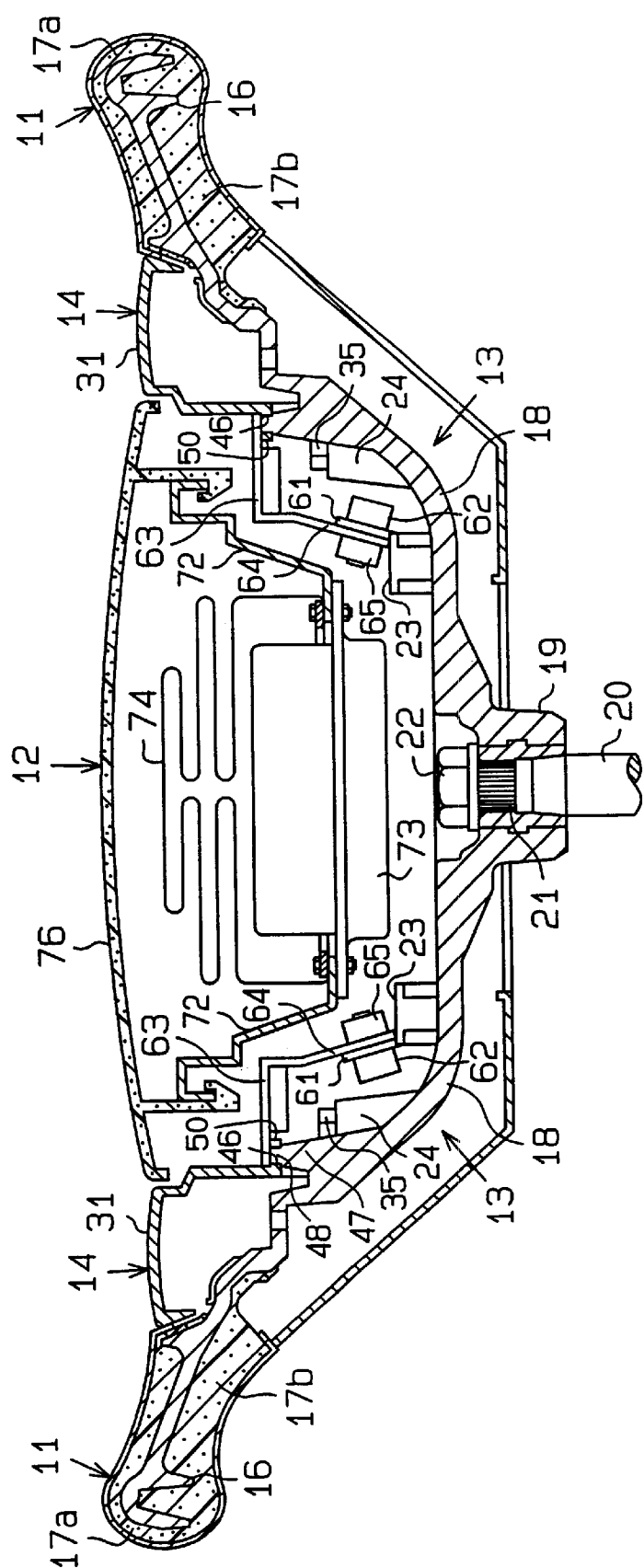
FIG. 6 is a cross-sectional view showing an intermediate portion of the steering wheel.
Figure 7:
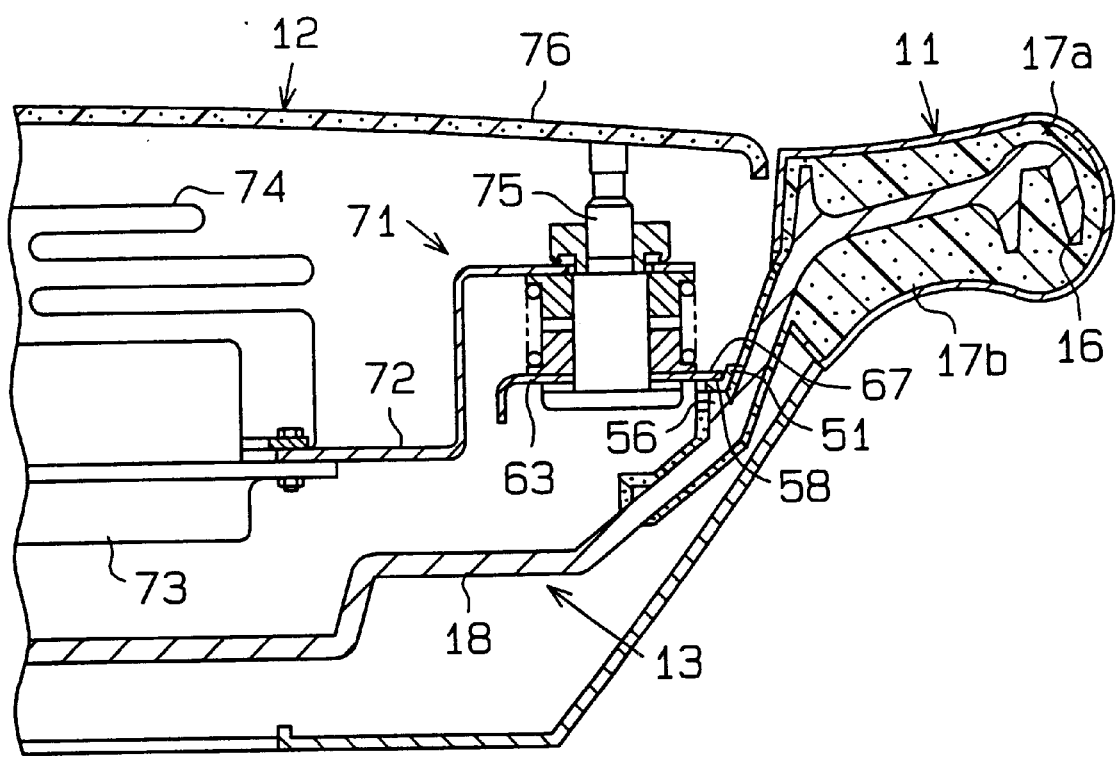
FIG. 7 is a cross-sectional view showing a portion of the steering wheel.

As shown in FIGS. 6 and 7, the ring 11 includes a ring core 16 and a cover 17a encompassing the core 16. The ring core 16 is formed of a light die-cast metal such as aluminum alloy. Each spoke 13 includes a spoke core 18 and a cover 17b encompassing the core 18. The spoke core 18 is formed of a light die-cast metal such as aluminum alloy. The four spokes 18 are connected to one another by a boss 19. The covers 17a, 17b are formed as one body of a soft synthetic resin (for example, foamed polyurethane). The boss 19 is engaged with a serration 21 formed on an upper end of a steering shaft 20, as viewed in FIG. 6. The boss 19 rotates integrally with the steering shaft 20 and is secured to the serration 21 by a nut 22.

Figure 1:
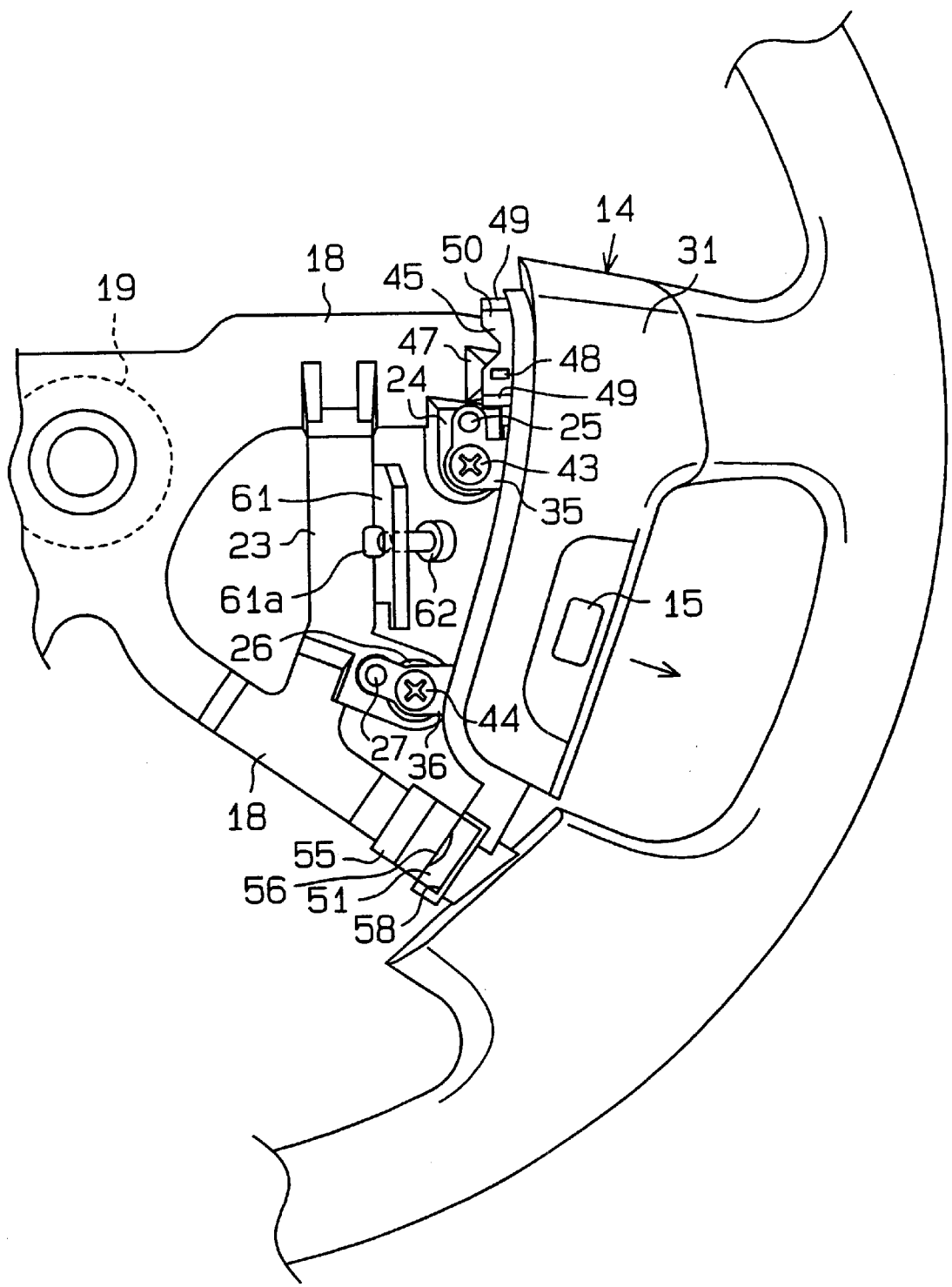
FIG. 1 is a plan view showing an accessory panel mounted on spokes.
Figure 2:
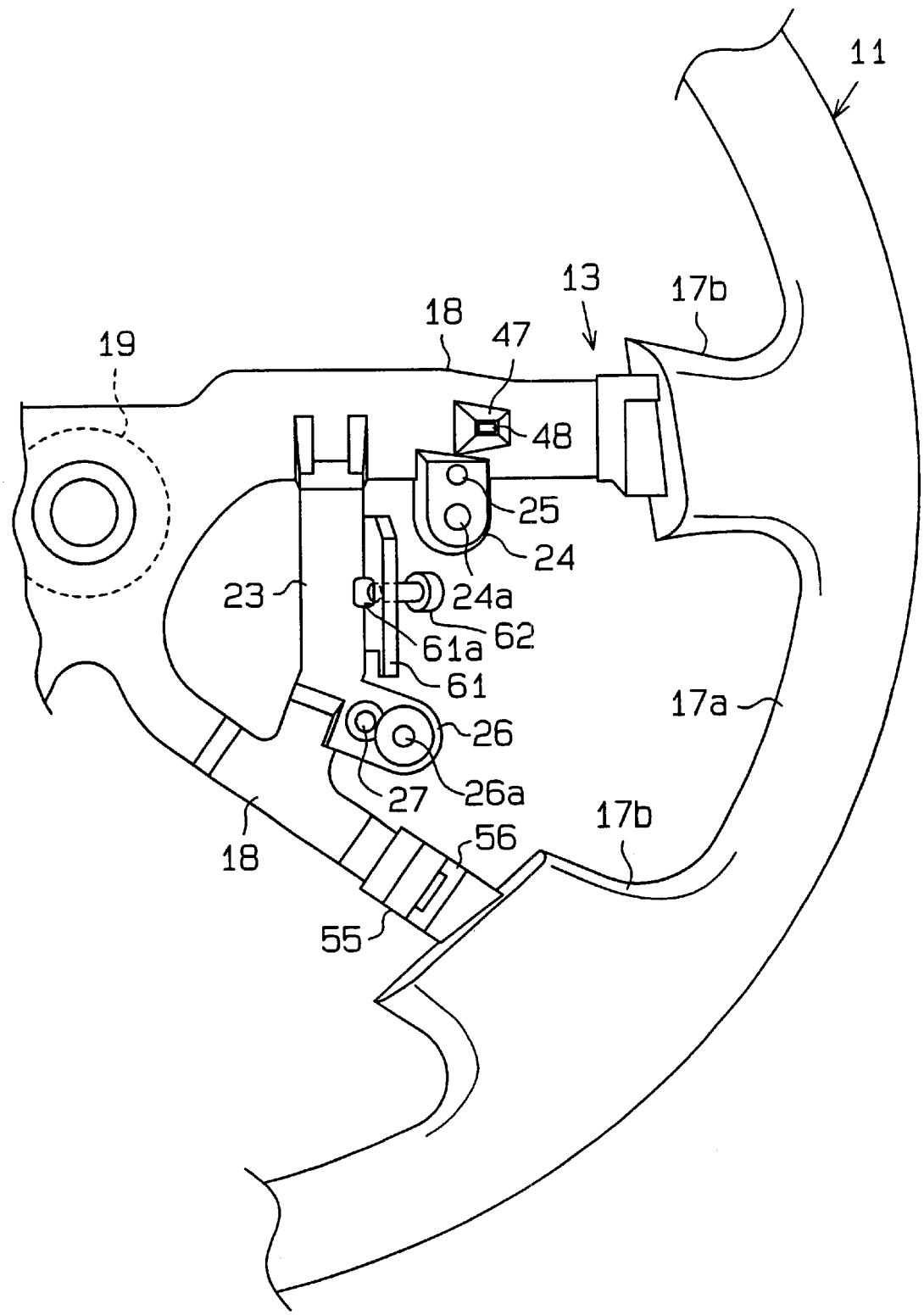
FIG. 2 is a plan view showing the spokes and a ring.

A structure for mounting each accessory panel 14 on the spoke cores 18 will hereafter be described with reference to FIGS. 1, 2, and 5 to 7. FIG. 2 shows the spokes 13 located to the right as viewed from the driver and the associated portion of the ring 11. A metal connecting core 23 connects the spoke cores 18 of the spokes 13 with each other. The connecting core 23 is formed integrally with the spoke cores 18. A mounting seat 24 is formed integrally with the spoke core 18 located upward as viewed in FIG. 2. A positioning pin 25 projects from a side of the mounting seat 24. Further, a mounting seat 26 is formed integrally with the connecting core 23. A positioning pin 27 projects from a side of the mounting seat 26.

Figure 3:
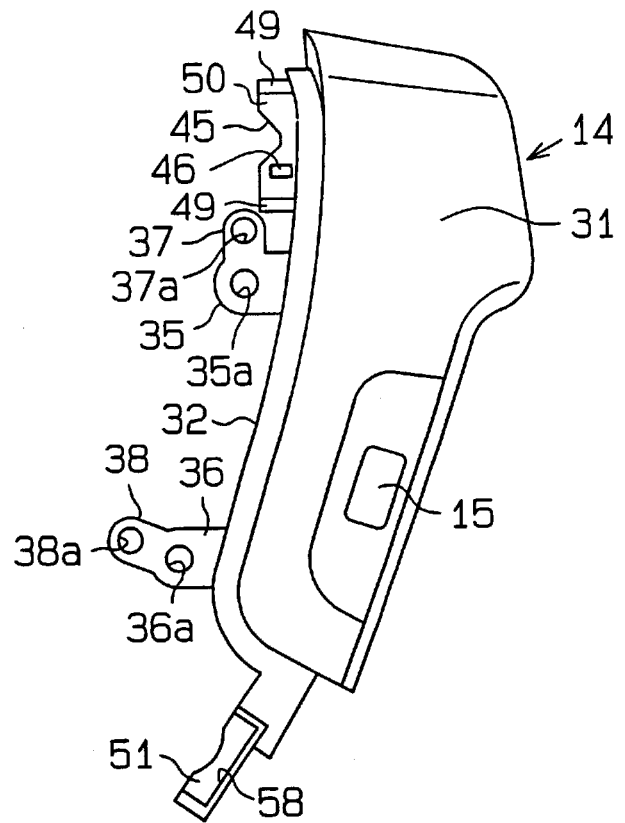
FIG. 3 is a plan view showing an accessory panel.
Figure 4:
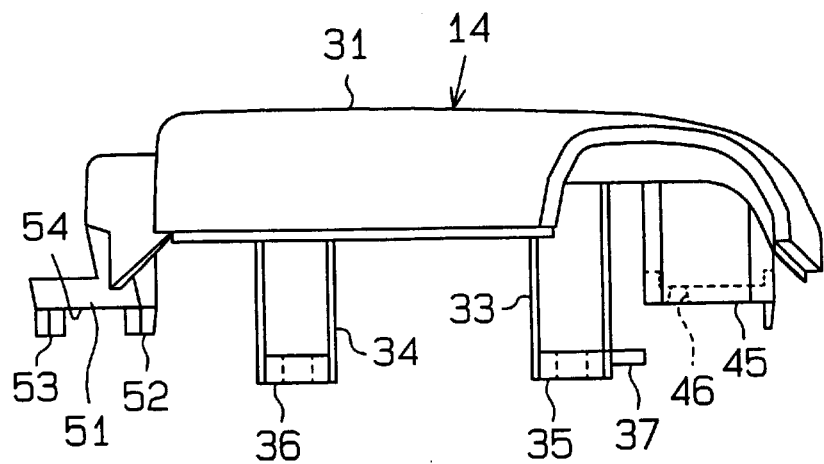
FIG. 4 is a side view showing the accessory panel.
Figure 5:
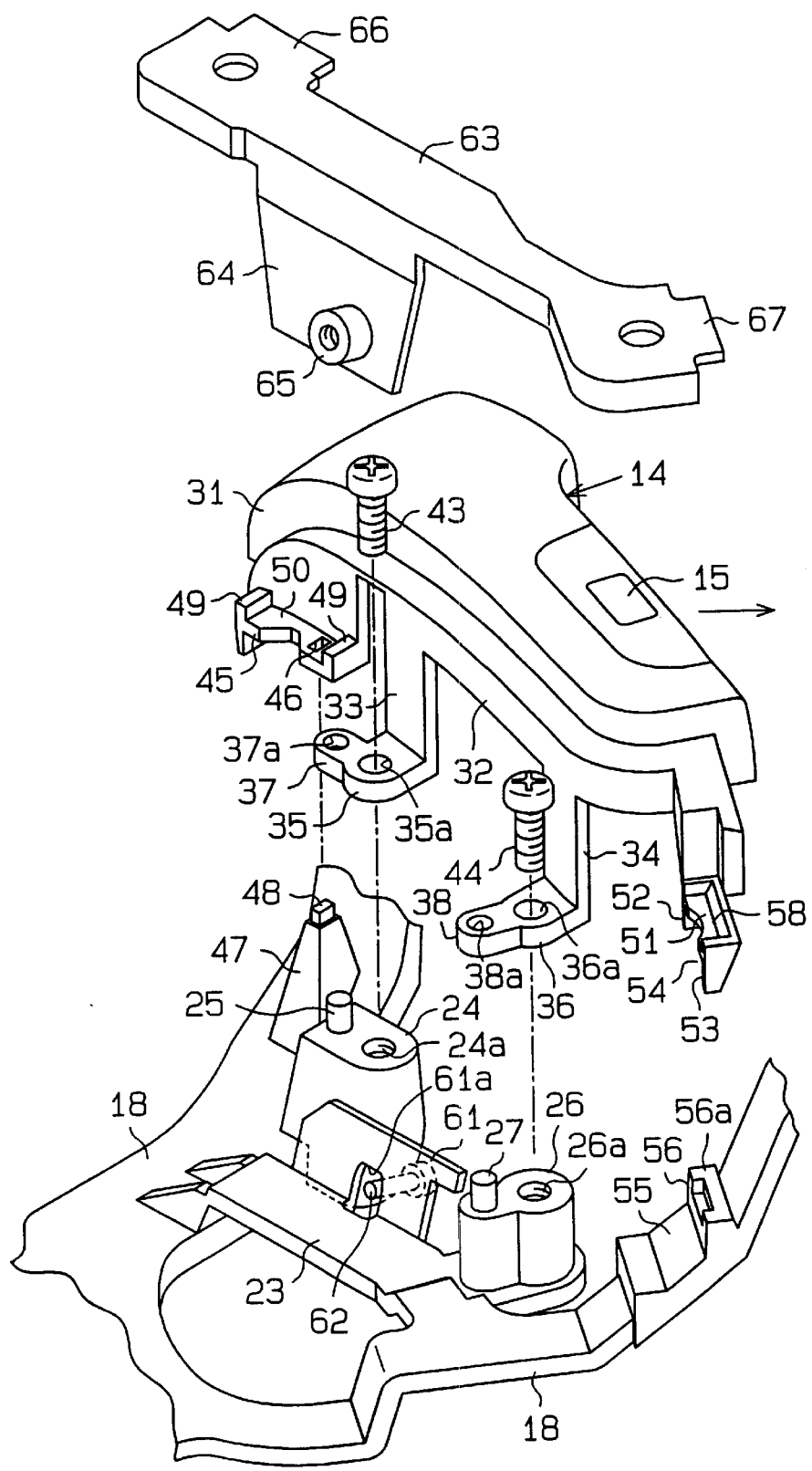
FIG. 5 is an enlarged, exploded perspective view showing the spokes, the accessory panel, and a mounting plate forming part of a pad.

FIG. 3 is a plan view showing the accessory panel 14, and FIG. 4 is a side view showing the accessory panel 14, as viewed from the right in FIG. 3. The accessory panel 14 has a body frame 31 formed as one body of a hard synthetic resin (for example, epoxy resin). As shown in FIG. 5, which is an exploded perspective view, a pair of extensions 33, 34 extend integrally from a side wall 32 of the frame 31. The extensions 33, 34 correspond to the mounting seats 24, 26, respectively. A pair of mounting portions 35, 36 each project laterally from a distal end of the associated extension 33, 34. Each mounting portion 35, 36 is formed integrally with the associated extension 33, 34. The mounting portion 35 has a hole 35a, and the mounting portion 36 has a hole 36a. A projection 37, 38 projects integrally from the associated mounting portion 35, 36. The projection 37 has a hole 37a corresponding to the positioning pin 25, and the projection 38 has a hole 38a corresponding to the positioning pin 27.

To mount the accessory panel 14 on the associated spoke cores 18 and its connecting core 23, the frame 31 is first lowered toward the spoke cores 18, as shown in FIG. 5. The mounting portions 35, 36 are then positioned on the associated mounting seats 24, 26 such that the positioning pins 25, 27 are fitted in the associated holes 37a, 38a. In this state, a bolt 43 is passed through the hole 35a of the mounting portion 35 and is fastened to a threaded hole 24a formed in the mounting seat 24. Further, a bolt 44 is passed through the hole 36a of the mounting portion 36 and is fastened to a threaded hole 26a formed in the mounting seat 26. The accessory panel 14 is thus secured to the spoke cores 18 and the connecting core 23.

In this embodiment, the mounting seats 24, 26, the extensions 33, 34, the mounting portions 35, 36, and the bolts 43, 44 form a fastening member for each accessory panel 14 with respect to the associated spoke cores 18.

A first extended portion 45 projects laterally from a distal end of the side wall 32 of the frame 31. The first extended portion 45 is formed integrally with the side wall 32. A square engaging hole 46 extends through the first extended portion 45. The engaging hole 46 may be replaced by a recess. The engaging hole 46 has a tapered cross-sectional shape to increase the opening area toward a lower end of the hole 46, as viewed in FIG. 5. A support 47 is formed on the spoke core 18 at a position corresponding to the engaging hole 46. A pillar-like restricting pin 48, which is an engaging projection, projects integrally from a distal end of the support 47. The restricting pin 48 is fitted in the engaging hole 46 and restricts movement of the frame 31 when force acts on the frame 31.

A pair of restricting ribs 49 project upward integrally from opposite sides of the first extended portion 45. A restricting recess 50 is formed between the restricting ribs 49. The recess 50 receives a first pressing portion 66 formed integrally with a mounting plate 63 of the pad 12, which will be later described. When the first extended portion 45 is clamped between the support 47 and the first pressing portion 66, the frame 31 is prevented from being displaced by the force acting on the frame 31.

A second extended portion 51 projects integrally from the end of the frame 31 opposing the first extended portion 45. A pair of restricting ribs 52, 53 project downward from opposite ends of a lower side of the second extended portion 51. An engaging recess 54 is formed between the restricting ribs 52, 53. A cover 55 extends from an end of the spoke core 18 near the ring 11. The cover 55 is formed of synthetic resin through molding. A support seat 56 having a support surface 56a is formed integrally with the cover 55. When the frame 31 is mounted on the spoke core 18, a lower side of the second extended portion 51 contacts the support surface 56a of the support seat 56. Further, the restricting ribs 52, 53 clamp the support seat 56 from its opposite sides. This prevents the frame 31 from being deformed by the force acting on the frame 31.

A restricting recess 58 is formed on an upper side of the second extended portion 51, as shown in FIG. 5. A second pressing portion 67, which is formed integrally with the mounting plate 63 of the pad 12 as will be described later, is fitted in the recess 58. The second extended portion 51 is clamped between the support seat 56 and the second pressing portion 67. This prevents the frame 31 from being deformed by the force acting on the frame 31.

A structure for mounting the pad 12 on the spoke cores 18 and the connecting cores 23, together with the structure of the pad 12, will hereafter be described. As shown in FIGS. 5 and 6, a mounting bracket 61 is formed integrally with each connecting core 23. A bolt 62 is rotationally supported at a side of each bracket 61 by means of a holder (not shown). A hole 61a extends through the bracket 61. The bolt 62 projects diagonally upward from the hole 61a.

Figure 8:
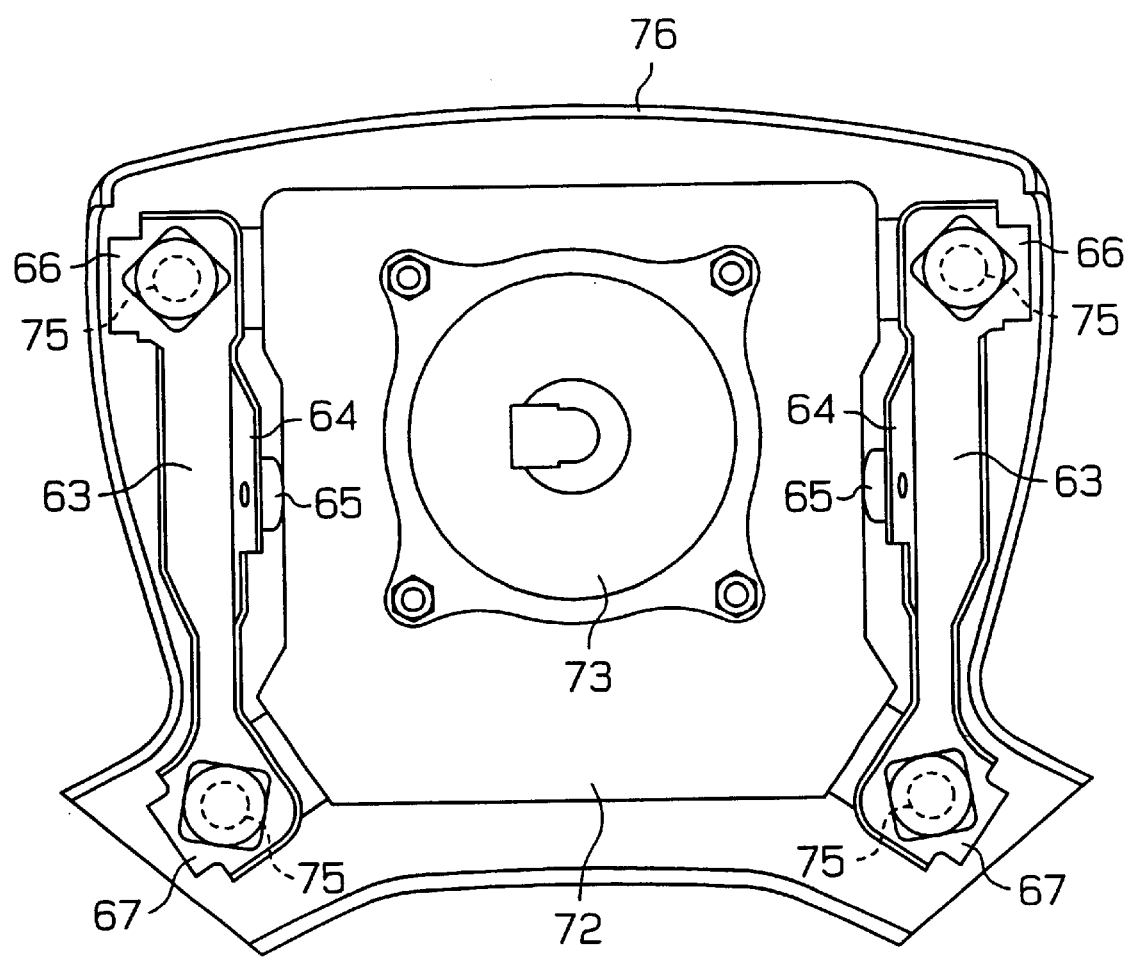
FIG. 8 is a bottom view showing the pad.

FIG. 8 shows a bottom of the pad 12. As shown in FIG. 8, the pad 12 has a pair of mounting plates 63. Each mounting plate 63 is supported by the associated bracket 61. As shown in FIG. 6, a slanted plate 64 extends integrally from the mounting plate 63 in a bent manner and contacts a slanted surface of the associated bracket 61. A nut 65 is welded to the slanted plate 64 of each mounting plate 63 and is engaged with the associated bolt 62. As described above, the mounting plate 63 includes the first and second pressing portions 66, 67, which are formed integrally with the mounting plate 63. The first pressing portion 66 and the second pressing portion 67 of each mounting plate 63 are engaged with the restricting recess 50 and the restricting recess 58 of the associated accessory panel 14, respectively.

An air-bag mounting plate 72 is provided between the mounting plates 63 and is connected to each mounting plate 63 through a floating mechanism 71, as shown in FIG. 7. An inflator 73 is secured to the air-bag mounting plate 72, and an air bag 74 is mounted on the air-bag mounting plate 72. Each floating mechanism 71 includes a plurality of support pins 75 (in this embodiment, two). A cover 76 is provided above the support pins 75, as viewed in FIG. 7. A horn is provided between each mounting plate 63 and the air-bag mounting plate 72.

A procedure for mounting the accessory panels 14 on the steering wheel W will now be described. FIGS. 2 and 5 each show the spokes 13 located to the right as viewed from the driver and the associated portion of the ring 11. In FIGS. 2 and 5, the accessory panel 14 is illustrated without being mounted on the associated spokes 13 and the pad 12.

Each accessory panel 14 is first moved toward the associated spokes 13 until the holes 37a, 38a of the accessory panel 14 are engaged with the associated positioning pins 25, 27. In this state, the restricting pin 48 is fitted in the engaging hole 46, and the support seat 56 is engaged with the engaging recess 54. The mounting portions 35, 36 are then fastened to the associated mounting seats 24, 26 with the associated bolts 43, 44.

Next, the pad 12 is moved toward the middle of the steering wheel W until the slanted plate 64 of each mounting plate 63 is abutted by the slanted surface of the associated bracket 61 and the nuts 65 correspond to the associated bolts 62. In this state, the first pressing portion 66 of each mounting plate 63 is engaged with the restricting recess 50. In the same manner, the second pressing portion 67 of the mounting plate 63 is engaged with the restricting recess 58. The bolts 62 are then fastened by the associated nuts 65 to secure the mounting plates 63 to the associated mounting brackets 61. In this state, the first extended portion 45 of each frame 31 is clamped between the associated support 47 and the first pressing portion 66 of the associated mounting plate 63. Further, the second extended portion 51 of the frame 31 is clamped between the associated support seat 56 and the second pressing portion 67 of the mounting plate 63.

The steering wheel W constructed as above has the following advantages.

(1) In the illustrated embodiment, the frame 31 of each accessory panel 14 is securely fastened to the associated spoke cores 18 at two positions, or the associated mounting seats 24, 26, by means of the two bolts 43, 44. The frame 31 is further secured to the associated spoke cores 18 by the first extended portion 45, the support 47, the support seat 56, and the second extended portion 51, which form a support member. This structure prevents the extensions 33, 34 of the frame 31 from being elastically deformed by the force acting in a horizontal direction (as indicated by the arrows of FIGS. 1 and 5) due to manipulation of the switch 15 of the accessory panel 14. The frame 31 is thus maintained at a predetermined position, thus improving the rigidity of the frame 13 when the accessory panel 14 is mounted on the spoke cores 18. Accordingly, it is unnecessary to reinforce the frame 13 by means of, for example, a separate metal plate. The number of parts is thus reduced and the manufacturing and mounting procedures are simplified.

(2) In the illustrated embodiment, the first extended portion 45 of each frame 31 is clamped between the first pressing portion 66 of the associated mounting plate 63 and the support 47. Further, the second extended portion 51 of the frame 31 is clamped between the second pressing portion 67 of the mounting plate 63 and the support seat 56. This structure prevents the first and second extended portions 45, 51 from becoming unstable, thus supporting the frame 31 in a stable manner. In addition, the first and second extended portions 45, 51 are pressed by the first and second pressing portions 66, 67, which project integrally from the associated sides of the mounting plate 63. This structure simplifies the manufacturing and mounting procedures, while reducing the number of the parts.

(3) In the illustrated embodiment, the restricting recesses 50, 58 are provided on the associated extended portions 45, 51 of each frame 31. Each restricting recess 50, 58 restricts the position of the associated pressing portion 66, 67. This structure further reliably prevents the accessory panel 14 from being displaced by the force acting on the accessory panel 14.

(4) In the illustrated embodiment, each engaging hole 46 has a tapered cross-sectional shape to increase its opening area toward the lower end of the hole 46. The restricting pin 48 is thus readily fitted in the engaging hole 46.

The present invention may be embodied with the following modifications.

Although the steering wheel W of the illustrated embodiment has four spokes 13, the steering wheels W may have two or three spokes 13 or five or more spokes 13.

The pad 12 of the illustrated embodiment includes the floating mechanisms 71. However, the floating mechanisms 71 do not necessarily have to be provided. The frame 31 of each accessory panel 14 may be pressed downward by an outer periphery of the cover 76 of the pad 12.

The present invention may be embodied as a steering wheel that does not include an air bag device.

Although each spoke core 18 is formed of aluminum alloy (aluminum die-cast material), other metal materials may be used. For example, the spoke core 18 may be formed of iron, magnesium, or their alloys.

In the illustrated embodiment, the first and second extended portions 45, 51 of each frame 31 are pressed by the first and second pressing portions 66, 67 of the mounting plate 63, respectively. However, the first and second pressing portions 66, 67 do not necessarily have to be provided.

In the illustrated embodiment, the support seat 56 is formed on the cover 55 extending from the associated spoke core 18. However, the support seat 56 may be formed directly on the spoke core 18.

Although not illustrated, an engaging recess may be formed in the distal end of the support 47. In this case, a matching projection projects from a distal end of the side wall 32 of the frame 31 and engages with the engaging recess. Further, an engaging recess may be formed in the support seat 56 of the cover 55, while a matching projection projects from the frame 31 and engages with the engaging recess.

It should be apparent to those skilled in the art that the present invention may be embodied in many other specific forms without departing from the spirit or scope of the invention. Therefore, the present examples and embodiments are to be considered as illustrative and not restrictive and the invention is not to be limited to the details given herein, but may be modified within the scope and equivalence of the appended claims.

What is claimed is:

1. An assembly for supporting a steering wheel accessory panel, the assembly comprising:

a steering wheel including:
      a ring,
      a plurality of spokes extending from the ring toward the middle of the steering wheel, and
      a pad encompassed by the ring, the accessory panel having a switch secured to the spokes; and
   an accessory panel mounting structure including:
      a support member for supporting the accessory panel with respect to the spokes; and
      a fastening member for fastening the accessory panel to the spokes,
      the support member being located separately from the fastening member,
   wherein the support member includes:
      a support formed in the associated spoke;
      an engaging projection projecting from an upper end of the support;
      a first extended portion extending laterally from the accessory panel;
      an engaging recess formed in the first extended portion and engaging with the engaging projection;
      a support seat provided in the associated spoke;
      a second extended portion extending laterally from the accessory panel; and
      an engaging recess formed in the second extended portion and engaging with the support seat;
   wherein:
      the pad includes a mounting plate; and
      the mounting plate includes a first pressing portion and a second pressing portion, the first pressing portion pressing the first extended portion toward the support, the second pressing portion pressing the second extended portion toward the support seat.

2. The assembly as set forth in claim 1, wherein:

a recess is formed in an upper side of the first extended portion for restricting a position of the first pressing portion; and
   a recess is formed in an upper side of the second extended portion for restricting a position of the second pressing portion.

3. An assembly for supporting a steering wheel accessory panel, the assembly comprising:

a steering wheel including:
  a ring,
  a plurality of spokes extending from the ring toward the middle of the steering wheel, and
  a pad encompassed by the ring, the accessory panel having a switch secured to the spokes; and
an accessory panel mounting structure including:
  a support member for supporting the accessory panel with respect to the spokes; and
  a fastening member for fastening the accessory panel to the spokes,
  the support member being located separately from the fastening member;
wherein the accessory panel includes a frame, and each spoke has a metal core, wherein the fastening member includes:
  a pair of extensions projecting from the frame of the accessory panel, the extensions being located separately from each other;
  a seat formed in the associated spoke at a position corresponding to each extension; and
  a bolt securing each extension to the associated seat.

4. The assembly as set forth in claim 3, wherein the fastening member further includes a positioning member for positioning each extension with respect to the associated seat.

5. The assembly as set forth in claim 4, wherein the positioning member includes:
  a projection projecting from the extension or the seat; and
  a hole formed in the other of the extension or the seat for engaging with the projection.

* * * * *